United States Patent [19]

Shum

[11] 4,394,767
[45] Jul. 19, 1983

[54] DATA TRANSMISSION OVER LONG DISTANCE CIRCUITS

[75] Inventor: Martin N. Y. Shum, Brookfield, Conn.

[73] Assignee: General DataComm Industries, Inc., Danbury, Conn.

[21] Appl. No.: 281,059

[22] Filed: Jul. 7, 1981

[51] Int. Cl.³ .............................................. H04B 3/20
[52] U.S. Cl. .................................. 375/13; 179/2 DP; 179/170.2
[58] Field of Search ................... 375/13, 121; 179/1 P, 179/170.2, 170.4, 170.8, 2 DP; 455/63, 67; 371/22, 23

[56] References Cited

U.S. PATENT DOCUMENTS

| 3,935,403 | 1/1976 | Penicaud et al. | 179/170.2 |
| 3,979,559 | 9/1976 | Roedel et al. | 179/2 DP |
| 4,165,449 | 8/1979 | Vachon | 179/170.2 |

OTHER PUBLICATIONS

B. D. L. Duttweiler and A. S. Chen, "A Single-Chip VLSI Echo Canceller," The Bell System Technical Journal, vol. 59, pp. 149–160, Feb. 1980.
George K. Helder and Peter C. Lopiparo, "Improving Transmission on Domestic Satellite Circuits", Bell Laboratory Record, vol. 55, pp. 203–207, Sep. 1977.
K. P. Judmann, "Mikroprozessoren", Technischer Verlag Erb, Section 1.7.3.5, pp. 69, 70.

Primary Examiner—Benedict V. Safourek
Assistant Examiner—Stephen Chin
Attorney, Agent, or Firm—Pennie & Edmonds

[57] ABSTRACT

A method and apparatus are disclosed which provide a common handshaking protocol for the 201, 202 and 208 modems. In accordance with the invention, connection of answer modem and originate modem to the communication line is followed by a period of silence that is sufficiently long to reactivate any echo suppressors in the communication line. Thereafter at least two training sequences are transmitted, one from the originate modem to the answer modem and the other from the answer modem to the originiate modem, each training sequence being sufficiently long to train up any echo canceller in the line. The lengths of the training sequences as received are compared with their lengths as transmitted to determine if the length of the sequence was shortened by an echo suppressor. If the length of the training sequences as received are significantly shorter than their lengths as transmitted, a sacrificial carrier is transmitted at the beginning of each transmission of data in a new direction. In the event the training sequences as received are not significantly shorter, each transmission of data in a new direction begins without a sacrificial carrier. As a result, greater data throughput can be achieved in the absence of echo suppressors and errors can be avoided while echo cancellers are being trained.

2 Claims, 5 Drawing Figures

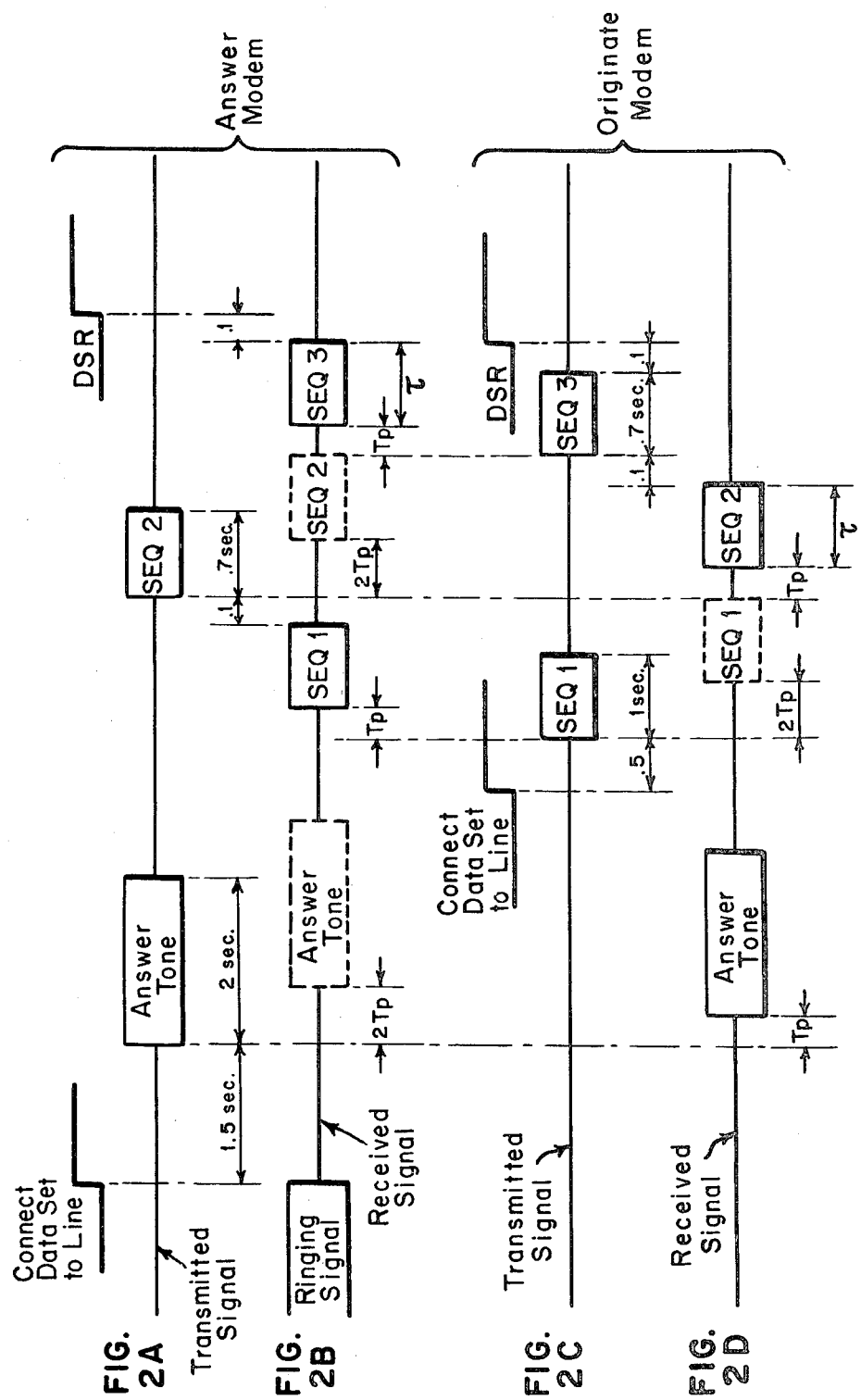

DATA TRANSMISSION OVER LONG DISTANCE CIRCUITS

BACKGROUND OF THE INVENTION

This relates to a method and apparatus for data transmission over long distance circuits such as those using earth satellites.

Satellite circuits provide good amplitude and delay responses, low harmonic distortion and a moderate and relatively fixed background noise level. These circuits are also immune from the fading that is typical on microwave circuits.

However, the enormous length of a satellite circuit introduces significant round trip propagation delay (RTPD) into two-way connection circuits. Such delays are typically in excess of 600 msec compared to delays of less than 50 msec encountered on land microwave circuits and less than 100 msec on cable connections. These extremely long delays significantly decrease two-way data throughput since there must be a delay equal in length to the RTPD between the time one terminal ends transmission and the time it begins to receive a response. Moreover, delays affect the timing that must be allowed for acknowledgements and the like that are used in signaling between the terminals interconnected by the circuit. Further, such circuits inevitably have echoes. These echoes are worse for half duplex data sets such as the 202S, 201C and 208B modems widely used in data communications.

Echoes are currently controlled by several methods. In one technique, approximately a 3dB loss is introduced in each transmission path so as to achieve at least a 6dB signal to echo ratio. The magnitude of this loss, however, depends on the total length of the circuit and the loss, of course, also reduces the received signal. Accordingly, this technique is not a good solution for a long haul network.

A second technique is the use of an echo suppressor. As explained at page 82 of *Transmission Systems For Communications* (Bell Telephone Laboratories, Revised 4th Edition 1971), an echo suppressor is basically a pair of voice operated switches which, while one subscriber is talking insert a loss of 35dB or more in the echo return path. Thus, the suppressor has the effect of changing a two-way four wire connection into a one-way two wire connection. Typically, echo suppressors are installed in a split mode so that half of the job is done at one end of the circuit and the other half at the other end. Such suppressors, however, are designed for voice transmission circuits in a way which introduces significant delay when the circuit is used for data transmission. In particular, it can take from 100 to 150 msec to switch the suppressors from a configuration supporting transmission in one direction to a configuration supporting transmission to the other direction.

Still another device for controlling echoes is the echo canceller which is now being introduced into satellite communication circuits. Echo cancelling is a linear process performed at both ends of the circuit which seeks to null out the echo by subtraction. Because the echo canceller has no prior knowledge of the characteristics of the circuit, the echo canceller must be adaptive; and to adapt the echo canceller to the circuit, a training preamble is required. The use of such a preamble, however, causes a delay of up to 500 msec before the circuit is properly conditioned for communication. Further details concerning echo cancelling techniques are set forth in "Improving Transmission in Domestic Satellite Circuits", *Bell Laboratories Record* (September, 1977) and D. L. Duttweiler and Y. S. Chen, "A Single Chip VLSI Echo Canceller", *Bell System Technical Journal*, Vol. 59, No. 2, pp. 149-160 (February 1980).

Alternatively, echoes may be controlled by modifications of the signalling protocols and/or the modem itself. For example, by attaching a unique identification code to the data sent from each modem, echoes of such data can be recognized and suppressed when they return to the modem. In another technique, the modem receiver is de-activated (or squelched) while the modem transmitter is sending and for as long thereafter as there is signal energy on the line. By ensuring that the duration of transmission is longer than the time it takes for the echo to return to the modem, the modem receiver will remain squelched until the echo also ends. If, however, the transmission duration must be artificially extended, data throughput will be reduced. In still another technique, the energy detection threshold of the modem receiver is set at a level which discriminates against the signal energy in the echo.

To cope with the satellite circuit problem, one manufacturer has modified the handshake sequence that is performed at the time that data communication is established between a pair of modems. In the past, this sequence included the following steps:

causing a ringing signal to be applied to the answer modem in response to the initiation of communication from an originate modem;

connecting the answer modem to the communication line after receipt of the ringing signal;

transmitting an answerback tone from the answer modem to the originate modem for two to three seconds after 1.5 to two seconds of silence following connection of the answer modem to the line; and transmitting data from the answer modem to the originate modem after 50 msec of silence following the answer back tone.

With 201 and 202 type modems, this handshake sequence has been modified to extend the 50 msec period of silence to 500 msec. This period of time is sufficient to reactivate the echo suppressors on the line which would be disabled by the answerback tone. To provide the echo suppressor sufficient time to cut in, a carrier signal is then transmitted for a period of approximately 150 msec and this in turn is followed by the data signal. As will be apparent, the function of the carrier signal is solely to provide a signal to trigger the echo suppressors and other signals could be used for this purpose.

This "sacrificial carrier" technique, as it is called, has several disadvantages. It ignores the possibility that there is an echo canceller instead of an echo suppressor in the line. As a result, it must provide sufficient time for echo suppressor cut in every time the direction of data communication is changed. Where there is a significant amount of data exchange between two terminals, this causes significant loss of throughput. In addition, this technique provides no means for training an echo canceller. As a result, the users of such a communication system must expect polling errors until the echo canceller has trained on the data being sent.

With the 208 modem, a different technique is used, namely, that of ensuring that the duration of transmission in one direction is longer than the round trip propagation delay. This, however, has the disadvantage of requiring the communication system to assume that the round trip propagation delay is 600 msec or more since the system does not know whether the originate and answer modems will be interconnected by satellite or by the shorter land circuits. As a result, the minimum duration of data communication in such a system must be on the order of 600 msec. To guarantee this 600 msec transmission time, the clear to send (CTS) response of the modem must be delayed by the same duration. As will be apparent such a 600 msec request to sent to clear to send delay significantly decrease data throughput.

SUMMARY OF INVENTION

I have devised a method and apparatus which provides a common handshaking protocol for the 201, 202 and 208 modems. In accordance with my invention, this novel handshaking sequence trains up any echo canceller in the circuit, detects the presence of any echo suppressor and uses a conventional signal preamble in the presence of echo cancellers and a sacrificial carrier sequence in the presence of echo suppressors. As a result, greater data throughout can be achieved in the absence of echo suppressors and errors can be avoided while echo cancellors are being trained.

These objects are accomplished by a handshaking sequence which begins as in the prior art by applying a ringing signal to an answer modem in response to a signal from an originate modem, connecting the answer modem to the communication line after receipt of the ringing signal, and transmitting an answerback tone from the answer modem to the originate modem after a period of silence following connection of the answer modem to the line. After receipt of the answer back tone, the originate modem is connected to the communication line. In accordance with the invention, this is followed by a period of silence that is sufficiently long to reactivate any echo suppressors in the communication line. Thereafter at least two training sequences are transmited one from the originate modem to the answer modem and the other from the answer modem to the originate modem, each training sequence being sufficiently long to train up any echo canceller in the line.

The length of the training sequences as received is compared with their lengths as transmitted to determine if the length of the sequence was shortened by an echo suppressor. If the length of the training sequences as received are significantly shorter than their lengths as transmitted, a sacrificial carrier is transmitted at the beginning of each transmission of data in a new direction. In the event the training sequences as received are not significantly shorter each transmission of data in a new direction begins without a sacrificial carrier.

BRIEF DESCRIPTION OF THE DRAWINGS

These and other objects, features and advantages of the invention will be more readily apparent from the following description of the best mode for carrying out the invention in which:

FIGS. 2A-2D depict certain signals present during the handshaking sequence of the present invention.

BEST MODE OF CARRYING OUT THE INVENTION

Figure 1:
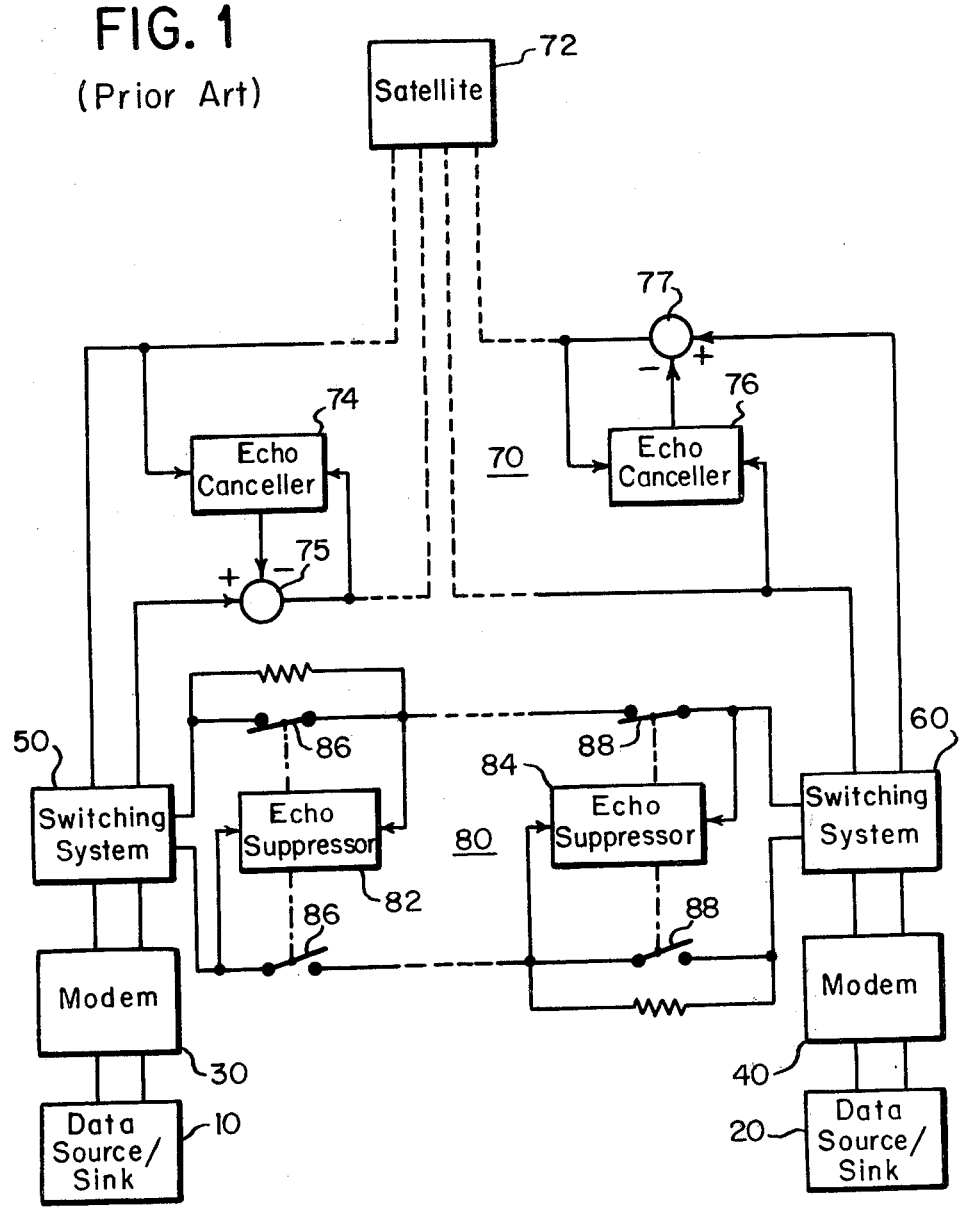
FIG. 1 is a block diagram of a typical communication system in which the invention may be practised.

FIG. 1 depicts a typical data communication system comprising first and second data source/sinks 10, 20, first and second modems (or data sets) 30, 40, and first and second switching systems 50, 60. As indicated in FIG. 1, data source/sink 10, modem 30 and switching system 50 are connected together and illustratively may constitute the local side of the communication system. Similarly, data source/sink 20, modem 40 and switching system 60 are connected together and illustratively constitute the remote side of the communication system.

Switching systems 50, 60 may be interconnected either by transmission network 70 or transmission network 80. As shown, transmission network 70 is an earth satellite network comprising earth satellite 72, first and second echo cancellers 74, 76 and first and second summing junctions 75, 77. Transmission network 80 is typical of a microwave or cable network and includes echo suppressors 82, 84 which are operated so as to produce at least a 35 db signal loss in one direction of communication but not in the other. Such signal loss is depicted schematically in FIG. 1 in the control of switches 86, 88 by echo suppressors 82, 84.

As will be apparent, the data communication shown in FIG. 1 has several ambiguities which must be accounted for by the apparatus which controls the communication network. Since in present practice this apparatus is ordinarily the modem, I will describe this control function as being performed by the modem. As will be apparent, however, the invention may also be practiced using equivalent devices which produce comparable control of the communication system. One ambiguity is, of course, the length of the communication circuit. A satellite communication system may easily be ten times the length of a land based communication system between the same two points. As a result, round trip propagation delays in the satellite communication system may be on the order of 600 msec or more compared with round trip propagation delays of 50 to 100 msec in microwave or cable systems. A second ambiguity is whether the circuit contains any echo control means at all and, if it does, whether such control means are echo cancellers or echo suppressors. If an echo canceller is used, some echo energy at the beginning of transmission is likely to be present while the canceller is trained. If an echo suppressor is used, the first 100 msec or so of signal at the beginning of each transmission in a different direction over the communication line is certain to be lost because of the need to switch the echo suppressors from a condition which supports communication in one direction to a condition which supports communication in the other direction.

I have devised a method and apparatus which detects the presence of any echo suppressor in the network, provides for the training of any echo canceller and permits increased data throughput in the absence of an echo suppressor.

The handshaking sequence begins as in the prior art by applying a ringing signal to an answer modem in response to a signal from an originate modem. Illustratively, the originate modem is modem 30 of FIG. 1 and the answer modem is modem 40. The ringing signal is depicted at the left hand side of FIG. 2B which illustrates the signal received at the input to the answer modem from the communication network. Modem 40 will not answer the ring until it receives from data source/sink 20 a data terminal ready (DTR) signal, indicating that the data source/sink is prepared to receive data. Upon receipt of the DTR signal, the answer modem is connected to the communication line.

For a period of 1.5 to 2 seconds, the answer modem remains silent. It then transmits an answerback tone for a duration of about two seconds. This tone is shown in FIG. 2A which illustrates the signal transmitted from the answer modem to the communication network. This tone is a pure tone of about 2025 Hz. In conventional circuits, the use of such a tone without any other signal will disable any echo suppressor in the line so that signals can be both transmitted and received over the communication network.

After a propagation delay of Tp, the answerback tone is received at originate modem 30 as shown in FIG. 2D which illustrates the signal received at the input to the originate modem from the communication network. After another propagation delay of Tp, the echo of the answerback tone is received at the input to the answer modem as shown in FIG. 2B.

After receipt of the answerback tone at originate modem 30, modem 30 is connected to the communication line. The originate modem then remains silent for a period long enough for any echo suppressors on the line to be reactivated. Typically, a wait of 0.5 seconds after connection to the line is sufficient for this purpose provided the originate modem is not connected to the line until after the answerback tone is no longer received at the originate modem. After this waiting period, the originate modem transmits a first random data sequence of 700 msec or so as shown in FIG. 2C to train up any echo canceller at the remote end of the communication network.

After the propagation delay of Tp, the first random data sequence is received at the answer modem as shown in FIG. 2B; and after an addition propagation delay of Tp the echo of this sequence is received back at the originate modem as shown in FIG. 2D. After detecting the end of the random data sequence, the answer modem remains silent for 100 msec and then transmits a second random data sequence shown in FIG. 2B for a period of 700 msec. After a propagation delay of Tp, this random data sequence is received by the originate modem as shown in FIG. 2D and after an additional propagation delay of Tp the echo of this random data sequence is received at the answer modem as shown in FIG. 2B.

The originate modem monitors the duration of the second random data sequence transmitted from the answer modem. If this sequence is less about 650 msec long, it assumes that a portion of the sequence is lost as a result of the action of an echo suppressor; and the originate modem sets a flat indicating the presence of an echo suppressor in the circuit. After detecting the end of the second random data sequence received from the answer modem, the originate modem is silent for 100 msec. It then transmits a third random data sequence for 700 msec as shown in FIG. 2C. One hundred msec after the termination of transmission of this signal, the originate modem switches into the data mode and transmits the data set ready signal to data source/sink 10 to which it is connected.

After a propagation delay of Tp the third random data sequence is received at the answer modem as shown in FIG. 2B. This sequence is monitored to determine if its length has been reduced by the presence of an echo suppressor in the line. If the length of the signal is less than about 650 msec, a flag is set in the answer modem. One hundred msec after termination of the third random data sequence, the answer modem switches into the data mode and the signal data set ready is applied to data source/sink 20.

Each modem separately detects the presence of an echo suppressor in the communication line between the modems and upon locating such a suppressor sets a flag. Beginning with data transmission after this handshaking procedure and every time thereafter that the direction of data transmission changes, the modem will then insert a sacrificial carrier in the front end of the data transmission.

If no echo suppressors are detected in the line, the flags will not be set and the sacrificial carrier will not be inserted.

When an echo suppressor is in the circuit, portions of the sacrificial carrier will be eliminated by the echo suppressor and will not reach the modem at the other end of the communication line. In the case of the 201 and 202 modems these signals will not be of any consequence because the carrier can readily be distinguished from data as it is in prior art modems. In the case of the 208 modem, this modem typically uses an adaptive equalizer to reduce signal distortion and to achieve synchronization. A training sequence must be transmitted at the front of the data transmission to train up this equalizer. Where a sacrificial carrier is to be transmitted, this carrier is advantageously a 600 Hz tone which is generated by a tone generator in the 208 modem and which is filtered out of the received signal by a notch filter already present in the conventional 208 modems. Thus, the signal that reaches the adaptive filter of a 208 modem used in the practice of the invention is similar to that which reaches the adaptive filter in prior art techniques.

What is claimed is:

1. A method of handshaking between an originate modem and an answer modem interconnected by a communication line comprising the steps of:
   causing a ringing signal to be applied to the answer modem in response to a signal from the originate modem;
   connecting the answer modem to the communication line after receipt of the ringing signal;
   transmitting an answerback tone from the answer modem to the originate modem after a period of silence following connection of the answer modem to the communication line;
   connecting the originate modem to the communication line after receipt of the answerback tone;
   waiting sufficiently long to reactivate any echo suppressors in the communication line;
   thereafter transmitting first and second training sequences, one from the originate modem to the answer modem and the other from the answer modem to the originate modem, said first and second training sequence being sufficiently long to train up any echo canceller in the communication line;
   detecting if the lengths of the first and second training sequences as received are significantly shorter than their lengths as transmitted; and
   in the event the training sequences as received are significantly shorter than their lengths as transmitted, transmitting a sacrificial carrier at the beginning of each transmission of data in a new direction on said communication line and in the event that the training sequences are not significantly shorter as received than as transmitted beginning each transmission of data in a new direction on said communication line without a sacrificial carrier.

2. In an apparatus for performing a handshaking procedure between an originate modem and an answer modem interconnected by a communication line, said apparatus comprising:

means for applying a ringing signal to the answer modem in response to a signal from the originate modem;

means for connecting the answer modem to the communication line after receipt of the ringing signal;

means for transmitting an answerback tone from the answer modem to the originate modem after a period of silence following connection of the answer modem to the communication line; and means for connecting the originate modem to the communication line after receipt of the answerback tone;

the improvements comprising:

means for transmitting first and second training sequences, one from the originate modem to the answer modem and the other from the answer modem to the originate modem, after a period of silence that is sufficiently long to reactivate any echo suppressors in the communication line, said first and second training sequences being sufficiently long to train up any echo canceller in the communication line;

means for detecting if the lengths of the first and second training sequences as received are significantly shorter than their lengths as transmitted; and in the event the training sequences as received are significantly shorter than their lengths as transmitted, means for transmitting a sacrificial carrier at the beginning of each transmission of data in a new direction on said communication line.

* * * * *